United States Patent
Bator et al.

(10) Patent No.: US 7,917,454 B2
(45) Date of Patent: Mar. 29, 2011

(54) SYSTEM AND METHOD FOR INSTANT ONLINE POSTAGE METERING

(75) Inventors: Feliks Bator, Easton, CT (US); David B. Chamberlin, Monroe, CT (US); James A. Euchner, Waccabuc, NY (US); Thomas J. Foth, Trumbull, CT (US); Andrei Obrea, Seymour, CT (US); David L. Rich, Shelton, CT (US); David W. Riley, Easton, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 12/701,760

(22) Filed: Feb. 8, 2010

(65) Prior Publication Data

US 2010/0153230 A1 Jun. 17, 2010

Related U.S. Application Data

(63) Continuation of application No. 10/626,850, filed on Jul. 22, 2003, now Pat. No. 7,689,518, which is a continuation of application No. 09/848,676, filed on May 3, 2001, now Pat. No. 6,619,544.

(60) Provisional application No. 60/202,507, filed on May 5, 2000.

(51) Int. Cl.
G06F 17/00 (2006.01)

(52) U.S. Cl. .................................................. 705/401

(58) Field of Classification Search .......... 705/401–410, 705/59–61
See application file for complete search history.

(56) References Cited

U.S. PATENT DOCUMENTS

| | | |
|---|---|---|
| 4,253,158 A | 2/1981 | McFiggans |
| 4,447,890 A | 5/1984 | Duwel et al. |
| 4,511,793 A | 4/1985 | Racanelli |
| 4,649,266 A | 3/1987 | Eckert |
| 4,725,718 A | 2/1988 | Sansone et al. |
| 4,752,950 A | 6/1988 | Le Carpentier |
| 4,757,537 A | 7/1988 | Edelmann et al. |
| 4,775,246 A | 10/1988 | Edelmann et al. |
| 4,812,994 A | 3/1989 | Taylor et al. |
| 4,831,555 A | 5/1989 | Sansone et al. |
| 4,837,701 A | 6/1989 | Sansone et al. |

(Continued)

FOREIGN PATENT DOCUMENTS

WO 9857302 12/1998

(Continued)

OTHER PUBLICATIONS

Title:New Meters Let Consumers Dial Up Postage, 1995.

(Continued)

*Primary Examiner* — Igor Borissov
(74) *Attorney, Agent, or Firm* — Brian A. Lemm; Charles R. Malandra, Jr.

(57) ABSTRACT

A system and method for instantly printing PC postage before establishing a postage meter account. The method includes the steps of a meter vendor obtaining a first meter license from the Post for a first meter; loaning the use of a first meter licensed in the customer's zip code to a customer; requesting a second meter license for the customer; initializing the first meter for use by the customer; and transferring the first meter to the Customer's meter license when the second meter license is received. Alternatively, when the second meter license is received a second meter is assigned to the customer and the first meter is reassigned to the meter vendor.

4 Claims, 6 Drawing Sheets

U.S. PATENT DOCUMENTS

| | | | |
|---|---|---|---|
| 4,864,506 | A | 9/1989 | Storace |
| 4,873,645 | A | 10/1989 | Hunter et al. |
| 5,233,657 | A | 8/1993 | Gunther |
| 5,454,038 | A | 9/1995 | Cordery et al. |
| 5,508,933 | A | 4/1996 | Abumehdi |
| 5,638,513 | A | 6/1997 | Ananda |
| 5,794,210 | A | 8/1998 | Goldhaber et al. |
| 5,812,666 | A | 9/1998 | Baker et al. |
| 5,822,738 | A | 10/1998 | Shah et al. |
| 5,822,739 | A | 10/1998 | Kara |
| 5,923,406 | A | 7/1999 | Brasington et al. |
| 5,943,658 | A | 8/1999 | Gravell et al. |
| 5,946,671 | A | 8/1999 | Herring |
| 6,005,945 | A | 12/1999 | Whitehouse |
| 6,098,058 | A | 8/2000 | Gravell et al. |
| 6,141,654 | A | 10/2000 | Heiden et al. |
| 6,151,591 | A | 11/2000 | Pierce et al. |
| 6,175,826 | B1 | 1/2001 | Malandra et al. |
| 6,385,731 | B2 | 5/2002 | Ananda |
| 6,438,530 | B1 | 8/2002 | Heiden et al. |
| 6,546,377 | B1 | 4/2003 | Gravell et al. |
| 6,671,813 | B2 | 12/2003 | Ananda |
| 2002/0046193 | A1 | 4/2002 | Bator et al. |
| 2003/0078893 | A1 | 4/2003 | Shah et al. |

FOREIGN PATENT DOCUMENTS

| | | | |
|---|---|---|---|
| WO | 9857303 | | 12/1998 |
| WO | 9857304 | | 12/1998 |
| WO | 9857305 | | 12/1998 |
| WO | 9857306 | | 12/1998 |
| WO | 9857460 | | 12/1998 |
| WO | 9948053 | | 9/1999 |
| WO | WO 99/48053 | * | 9/1999 |

OTHER PUBLICATIONS

XP-002137735, Information Based Indicia Program (IBIP) Indicium Specification—United States Postal Service, Jun. 13, 1996.

Bransten: "Second firm to test Internet postage meeting"; Wall Street Journal, Aug. 25, 1998, No. 169, Tue. ed, col. 4, p. B6.

Stamps/com Inc. S-1/A On Jun. 22, 1999 EX-10.32 (the internet printout of http;//www.secinfo.com/dSq2u.6Vx.6.htm).

SEC Info-Stamps/Com Inc—10-K405-for Dec. 31, 1999 (the internet printout).

SEC Info-Stamps/Com Inc—S-1/A On Jun. 22, 1999 (the internet printout).

Leon, U.S. Appl. No. 60/165,885, filed Nov. 16, 1999, pp. 22.

Kuebert; Performance Criteria and Security Architecture for Open IBI Postage Evidencing System; United States Postal Service Specification; Apr. 2004.

Production, Distribution, and Use of Postal Security Devices and Information-Based Indicia; Proposed Rule; 39 CFR Parts 111 and 502; Federal Register: Oct. 2, 2000 (vol. 65, No. 191).

Postage Solutions; The internet print-out of http://www.usps.com/postagesolutions/federalreg.html.

E-Stamps and Stamps.com to Duke It Out; Internet print-out, 4 pages.

Stamps.com to Cooperate with Department of Justice Investigation of Pitney Bowes, Defend a Patent Related Lawsuit Brought by Pitney; Internet print-out; 2 pages.

Foreign Patent Documents and Non-Patent Literature Documents cited above was previously submitted to, or cited by, the Office in earlier U.S. Appl. No. 10/626,850, which is being relied upon for an earlier effective filing date under 35 U.S.C. 120. Pursuant to 37 CFR 1.98(d), additional references need not be provided.

* cited by examiner

SYSTEM AND METHOD FOR INSTANT ONLINE POSTAGE METERING

This application is a continuation of application Ser. No. 10/626,850, filed Jul. 22, 2003, now U.S. Pat. No. 7,689,518, which is a continuation of application Ser. No. 09/848,676, filed May 3, 2001, now U.S. Pat. No. 6,619,544, which is a continuation-in-part application of U.S. Provisional Application Ser. No. 60/202,507, filed May 5, 2000, each of which is hereby incorporated by reference.

FIELD OF THE INVENTION

The invention disclosed herein relates generally to systems and methods for evidencing postage payment, and more particularly to systems and methods for evidencing postage payment using a personal computer.

BACKGROUND OF THE INVENTION

Postage metering systems have been developed which employ encrypted information that is printed on a mailpiece as part of an indicium evidencing postage payment. The encrypted information includes a postage value for the mailpiece combined with other postal data that relate to the mailpiece and the postage meter printing the indicium. The encrypted information, typically referred to as a digital token or a digital signature, authenticates and protects the integrity of information, including the postage value, imprinted on the mailpiece for later verification of postage payment. Since the digital token incorporates encrypted information relating to the evidencing of postage payment, altering the printed information in an indicium is detectable by standard verification procedures. Examples of systems that generate and print such indicium are described in U.S. Pat. Nos. 4,725,718, 4,757,537, 4,775,246 and 4,873,645, each assigned to the assignee of the present invention.

Presently, there are two postage metering device types: closed system and open system. In a closed system, the system functionality is solely dedicated to metering activity. Examples of closed system metering devices, also referred to as postage evidencing devices, include conventional digital and analog (mechanical and electronic) postage meters wherein a dedicated printer is securely coupled to a metering or accounting function. Typically, in a closed system, the printer is securely coupled and dedicated to the meter, and printing evidence of postage cannot take place without accounting for the evidence of postage. In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a postage evidencing device with a non-dedicated printer that is not securely coupled to a secure accounting module. An open system indicium printed by the non-dedicated printer is made secure by including addressee information in the encrypted evidence of postage printed on the mailpiece for subsequent verification. See U.S. Pat. Nos. 4,725,718 and 4,831,555, each assigned to the assignee of the present invention.

Recently, the United States Postal Service ("USPS") has approved personal computer (PC) postage metering systems as part of the USPS Information-Based Indicia Program ("IBIP"). The IBIP is a distributed trusted system which is a PC based metering system that is meant to augment existing postage meters using new evidence of postage payment known as information-based indicia. The program relies on digital signature techniques to produce for each mailpiece an indicium whose origin can be authenticated and content cannot be modified. The IBIP requires printing a large, high density, two-dimensional ("2-D") bar code on a mailpiece. The 2-D bar code, which encodes information, is signed with a digital signature. A description of the IBIP is found in IBIP PERFORMANCE CRITERIA FOR INFORMATION-BASED INDICIA AND SECURITY ARCHITECTURE FOR OPEN IBI POSTAGE METERING SYSTEMS (PCIBI-O), a published draft specification dated Feb. 23, 2000, which is referred to herein as the "IBIP Specification". The IBIP Specification defines the proposed requirements for a new indicium that will be applied to mail being created using IBIP, defines the proposed requirements for a Postal Security Device ("PSD"), which is a secure processor-based accounting device that is couple to a personal computer to dispense and account for postal value stored therein to support the creation of a new "information-based" postage postmark or indicium that will be applied to mail being processed using IBIP, and defines the proposed requirements for a host system element (personal computer) of IBIP.

The IBIP Specification defines a stand-alone open metering system, referred to herein as a PC Meter, comprising a PSD coupled to a PC, which operates as a host system with a printer coupled thereto. The PC runs the metering application software and associated libraries and communicates with the attached PSD. The PC Meter processes transactions for dispensing postage, registration and refill on the PC. Meter processing is performed locally between the PC and the PSD coupled thereto. Connections to a Data Center, for example for registration and refill transactions, are made locally from the PC through a local or network modem/internet connection. Accounting for debits and credits to the PSD is also performed locally, logging the transactions on the PC. Several application programs running on the PC, such as a word processor or an envelope designer, may access the metering application software. An example of a PC Meter product that had been approved by the USPS was the E-Stamp® Internet Postage which was distributed by E-Stamp Corporation of Houston, Tex.

The USPS has approved an alternative version of the PC Meter in which the PSD function is performed at a server that is remote from the PC and accessible through the Internet. A description of the alternative version of the PC Meter is found in IBIP PERFORMANCE CRITERIA FOR INFORMATION-BASED INDICIA PROGRAM (IBIP) SYSTEMS EMPLOYING CENTRALIZED POSTAL SECURITY DEVICES, a published draft specification dated Aug. 17, 2000, which is referred to herein as the "IBIP Centralized Specification".

The IBIP Specification defines this alternative version, which is referred to herein as a "virtual meter", which is a network metering system that has many client PCs without any PSDs coupled thereto. The client PCs run application software for requesting and formatting postage indicia, but all PSD functions are performed on server(s) located at a Data Center. The PSD functions at the Data Center may be performed in a secure device attached to a computer at the Data Center, or may be performed in the Data Center computer itself. The client PCs must connect with the Data Center to process transactions such as postage dispensing, meter registration, or meter refills. Transactions are requested by the client PC and sent to the Data Center for remote processing. The transactions are processed at the Data Center and the results are returned to the client PC. Accounting for funds and transaction processing are centralized at the Data Center. See, for example, U.S. Pat. Nos. 5,454,038 and 4,873,645, which are assigned to the assignee of the present invention. An example of a virtual meter is Clickstamp® Online Internet postage metering system, offered and maintained by Pitney Bowes Inc. See also, International Patent Applications WO/9857302, WO98/57303, WO98/57304, WO98/57305, WO98/57306 and WO/9857460, each having an international filing date of Jun. 12, 1998, for further descriptions of virtual metering.

Although virtual metering is now authorized by the USPS, the vendors have experienced reluctance on the part of potential mailers to go through the registration process and wait for approval for a meter license before they are allowed to print postage obtained over the Internet. The delay caused by a mailer waiting for approval for a meter license before being able to print postage from a PC is perceived as a deterrent to acquiring mailers. Vendors of PC postage have resorted to paying mailers, for example $25-$50 free postage, as an incentive to try PC postage. The problem with this technique is that many mailers fail to use the service beyond the free postage.

It is an object of the present invention to provide a system and method that eliminates the delay and minimizes the cost of acquiring a mailer.

SUMMARY OF THE INVENTION

The present invention provides for instant metering of online postage. The present invention further provides a system and method for printing postage on a PC printer without having a meter license or a meter account. The present invention is described for use with the U.S. Postal Service (USPS). It will be understood by those skilled in the art that the present invention is suitable for use for metering postage with any Post.

The USPS requires that the accounting for postage of the mail items that enter the USPS system (referred to as inbound postage) be reconciled by crediting the point of origin post office for the postage of the mail items that enter the USPS system at such post office. The present invention provides different embodiments of instant metering of online postage, each of which meets such USPS requirement.

A first embodiment provides a meter account licensed to a meter vendor for dispensing online postage to customers from a plurality of origin zip codes. At predetermined intervals, the USPS receives a report of the meter account of the postage dispensed and amount dispensed by origin zip codes. A second embodiment is similar to the first embodiment except it provides at least one vendor meter per zip code (thus assuring accounting by zip code).

Another embodiment provides a plurality of vendor meters per zip code whereby a mailer is loaned one of the vendor meters corresponding to the zip code from which the mailer is originating entry into the USPS system and the use of the meter is revoked when usage stops. An alternate to this embodiment provides a plurality of temporary meters that are temporarily loaned to respective mailers until the USPS grants the meter license to the mailer.

Concerning the payment for postage over the Internet, the present invention includes the capability for paying for postage through a micropayment system. The present invention is compatible with a postage subsidy system and method for printing advertisements on a mailpiece, including coupons with barcodes to identify the sender and receiver (and typically, the redeemer) of the coupon. The present invention further provides the concepts of purchasing an "e-book of stamps" over the Internet and interfacing with an online rewards program.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

As previously described, the USPS needs the point of origin zip code so that the proper post office gets "credit" for inbound mail pieces. Up to now, customers using a virtual postage metering system to evidence postage on mail had to obtain a meter license for a meter account with a dedicated origin zip code. In accordance with the present invention, users can meter postage outside of the current process of assigning each user a meter license. In describing the present invention, a known virtual metering system is first described followed by the transition to an instant virtual metering system.

Figure 1:
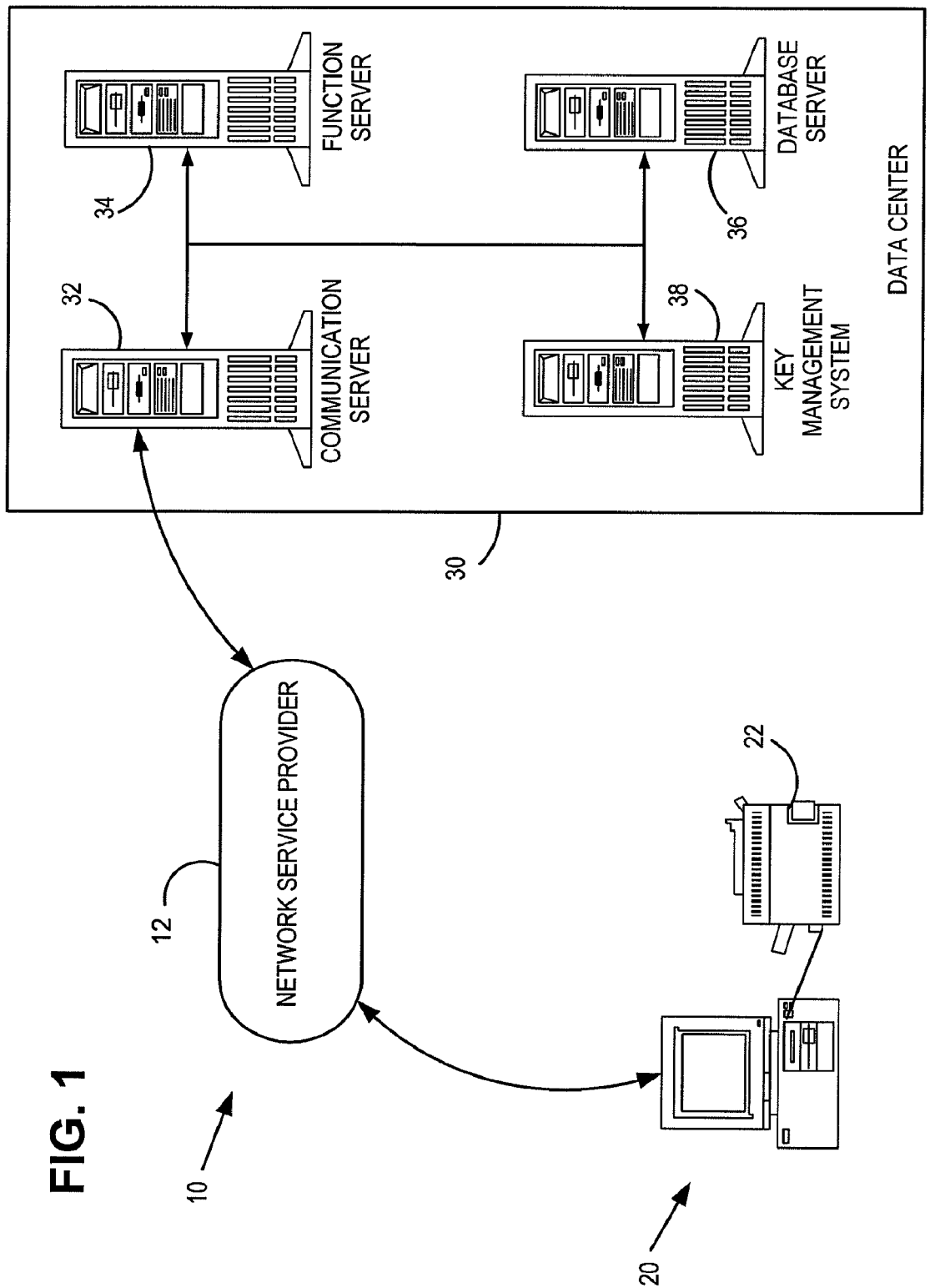
FIG. 1 is a block diagram of a virtual metering system.

In describing the present invention, reference is made to the drawings, wherein there is seen in FIG. 1, a virtual postage metering system, generally designated 10. The virtual postage metering system 10 includes a plurality (only one is shown) of personal computer (PC) systems, generally designated 20, each having access to a printer 22 for printing evidence of postage on an envelope. PC 20 is connected, via a network service provider 12, with a transaction processing Data Center 30 that performs postal accounting and evidencing of postage. The virtual postage metering system 10 allows each customer to use a conventional PC to remotely obtain evidence of postage payment on an as needed basis. Unlike conventional postage metering systems, virtual postage metering system 10 does not include any meter hardware located at the customer's site. Nor are any postal funds stored at the customer's site. All metering and accounting of funds occur at Data Center 30 using functional software and database records. Previously noted International Patent Application WO/9857302 discloses a virtual postage metering system in which the database records in Data Center 30 comprised a plurality of meter accounts each of which represent a registered customer's licensed postage meter.

In virtual postage metering system 10, a meter vendor, such as Pitney Bowes Inc., provides the customer with client software that runs on PC 20, e.g., the client software may be downloaded from the vendor's Internet server. Alternatively, the client software may be Internet browser-based pages that provide customer interactions with the Data Center 30. The meter vendor also manages Data Center 30. The client software initiates communications with Data Center 30 which performs metering transactions to evidence postage for a single mailpiece or batches of mailpieces. The client software establishes a connection to Data Center 30, and requests postage by providing postal information relating to the requested transactions, such as postage amount, addressee information and the origin of deposit for each mailpiece. Data Center 30 receives the postal information, determines the origin ZIP for the mailpiece(s), performs accounting functions and generates an encrypted evidence of postage payment, such as a token or digital signature, and sends indicium information including the token, to PC 20. PC 20 receives the indicium information, creates an indicium bitmap, which can be displayed on a PC monitor (not shown) and printed on the mailpiece by printer 22. Alternatively, Data Center 30 creates the indicium bitmap and sends to indicium bitmap to PC 20. PC 20 then disconnects from Data Center 30 or requests another transaction. The connection between PC 20 and Data Center 30 may be through a Network Service Provider, such as on the Internet, or by direct dial using the PC's modem.

Virtual postage metering system 10 provides advantages and features found in virtual metering systems such as the previously noted Clickstamp® Online Internet postage metering system. Virtual postage metering system 10 eliminates the need to maintain and account for traditional metering devices at each customer's site and provides flexibility for handling requests from multiple origins of deposit by each customer. Virtual postage metering system 10 also provides value added services that are not available with conventional meter devices, such as, real-time address hygiene, direct marketing services and trickle charge postage payment. Virtual postage metering system 10 can provide customer authentication by Data Center 30 to identify customers who have previously established user accounts. When a customer has been authenticated for each request, for example, by a username, password or other conventional methods, Data Center 30 services the request, and returns indicium information to the PC 20 where the indicium is created and printed on the mailpiece.

Referring again to FIG. 1, the customer initiates a postage evidencing transaction by establishing communications between PC 20 and Data Center 30. At Data Center 30, a Communication Server 32 supports connectivity from various communication technologies and protocols. Communication Server 32 merges all incoming traffic from a plurality of customers and routes it to a Function Server 34, which includes application software that supports customer sign-on, postage dispensing and postal reporting. All customer and meter information is accessed from a Database Server 36 where the information is securely stored using secure cryptographic processes and protocols as described below. Data Center 30 maintains cryptographic keys for each meter account in Database Server 36. The cryptographic keys are used for postage evidencing and verification as well as for security of the records stored in Database Server 36. A Key Management System 38 administers all cryptographic keys used in virtual postage metering system 10. The cryptographic keys may be distributed to verifiers in remote locations. U.S. Pat. No. 5,812,666, filed Oct. 23, 1995, and assigned to the assignee of the present invention, describes such a key management system.

One or more cryptographic modules, referred to herein as secure "boxes", are located within Data Center 30 and are used to perform cryptographic processes. Each secure box is a secure, tamper-evident and tamper-responding device, including a processor and memory that stores encryption keys and performs cryptographic operations using the keys within the secure boundary of the device. Data Center 30 includes several types of secure boxes as disclosed in the previously noted International Patent Application WO 98/57304. Data Center 30 may include multiple boxes of each type for redundancy and performance.

In accordance with the present invention, virtual metering system 10 transitions to an instant virtual metering system when the database records in Data Center 30 include one or more meter accounts licensed to the vendor. In the instant virtual metering system 10, the vendor meter account(s) is (are) used by customers to obtain postage payment evidencing without waiting for meter accounts to be assigned to individual customers.

Instant virtual postage metering system 10 provides a metering system that has the capability of originating transactions from multiple origins of deposit. See, for example, U.S. Pat. No. 6,546,377, which describes individual meter accounts having multiple origins of deposit. Various methods can be used to determine the origin of deposit for a requested transaction. For example, a method for determining origin ZIP code using a caller ID from a telephone call is disclosed in U.S. Pat. No. 5,943,658, filed Dec. 31, 1996, and assigned to the assignee of the present invention.

Figure 2:
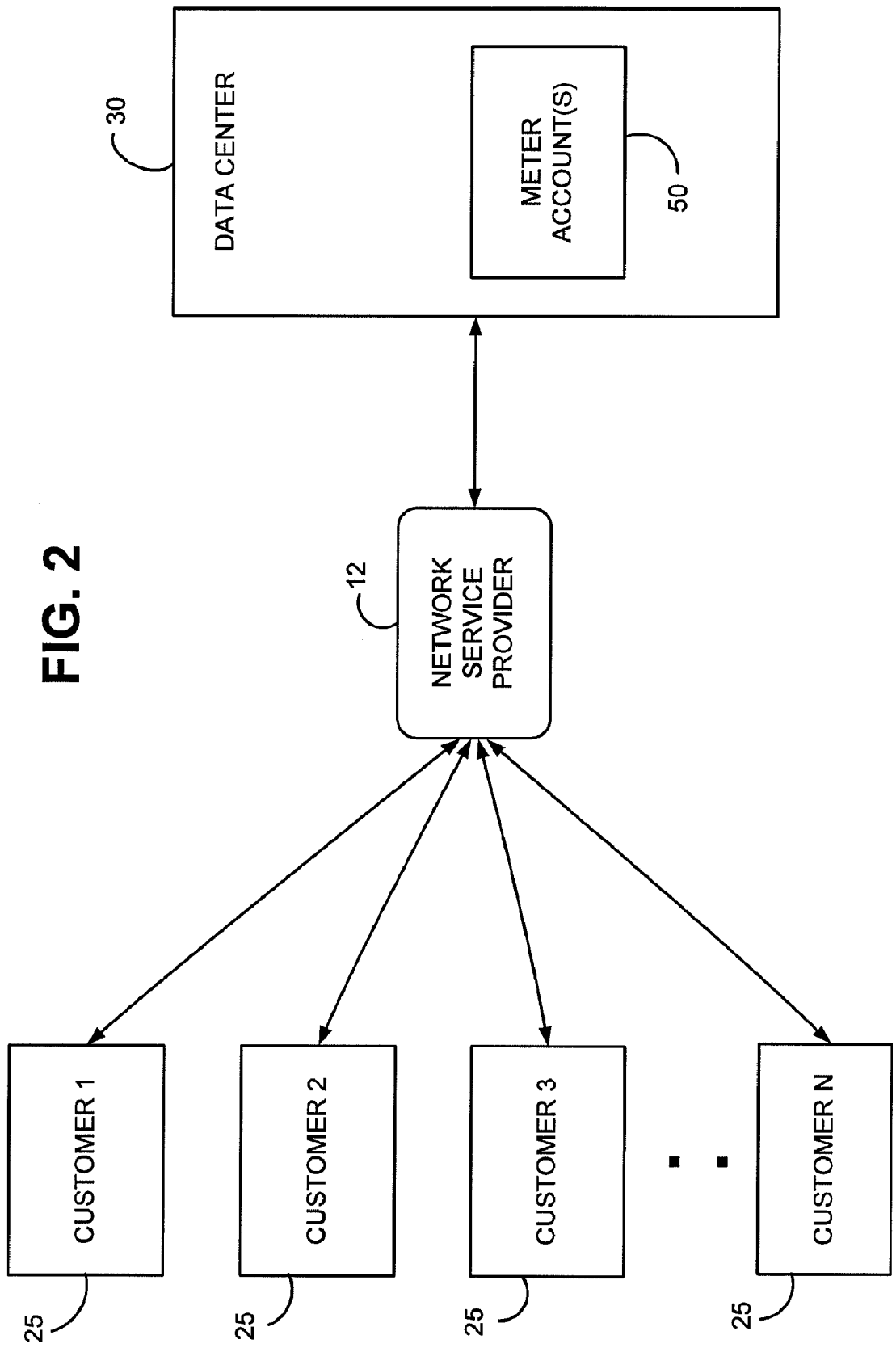
FIG. 2 is a block diagram of a first embodiment of an instant virtual metering system with a vendor meter account dispensing postage for any origin zip code.

Referring now to FIG. 2, in a first embodiment of the present invention, a vendor meter account 50, also referred to herein as remote meter 50, is located at a remote Data Center 30 controlled, for example by the postage meter vendor. The meter account 50, which is assigned to the postage meter vendor, dispenses postage payment evidence to a plurality of customers 25. Customers 25 download postage payment evidencing from the remote meter 50, preferably through the Internet. All customers 25 dispense postage from vendor meter 50. When postage is dispensed, a customer 25 indicates in which local post office the mail will be deposited, i.e. the origin of deposit. The previous post office used by a customer would be remembered and would act as a default. A number of means could be used to direct the user to choosing the right post office, such as the customer's current address and/or phone number, customer's city with a drop down list control (if necessary) of post offices and their locations. Alternatively, the origin of deposit can be determined as previously described. At some predetermined interval, the postage meter vendor provides to the USPS for its accounting needs, an accounting of the amount of postage dispensed by the meter 50 and the amount of postage handled by each post office based on the origin of deposit zip code as specified by the customers 25 or otherwise determined for all transactions completed during the interval. It is noted that Data Center 30 may include a plurality of vendor meter accounts 50 for the purpose of handling requests from a plurality of customers at one time.

Figure 3:
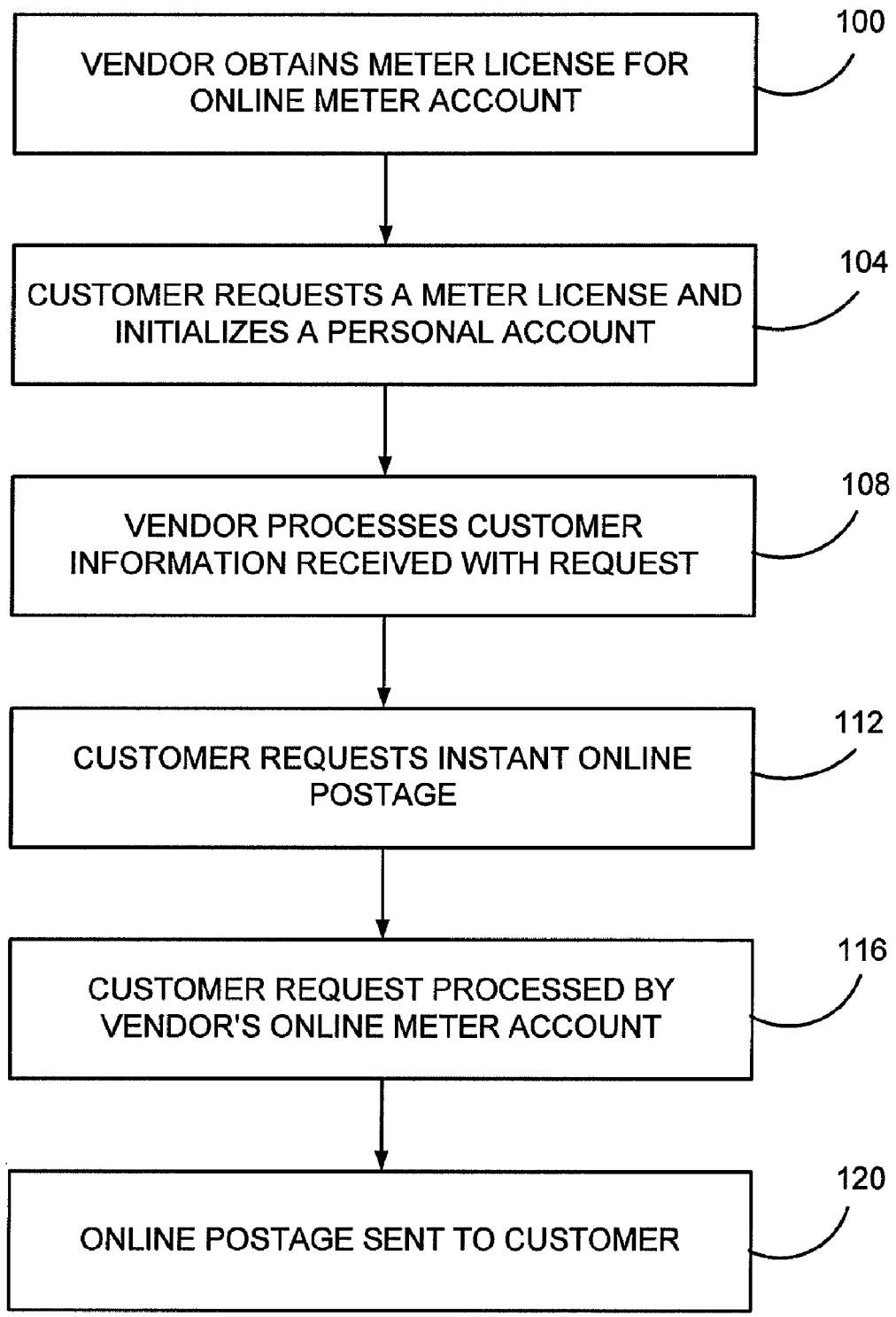
FIG. 3 is a flow chart of the process of dispensing postage with the instant virtual metering system of FIG. 2.

Referring now to FIG. 3, the process of dispensing postage in the embodiment described in FIG. 2 is now described. At step 100, vendor obtains at least one meter license for an online meter account. The meter account is licensed to process transactions for a plurality of origin zip codes. At step 104, a customer initializes a personal account preferably by completing a request for a meter license that heretofore must be approved before customer could download postage. At step 108, the vendor processes customer information, such as name, address and method of payment (such as a credit card), that is provided with the request form the meter license. At step 112, the customer requests online postage by entering or confirming postal information, including recipient address and postage amount and origin zip code. At step 116, vendor "loans" the use of the meter to the customer by processing the customer's requested transaction using the vendor meter account. Such processing includes charging the customers credit card account for the amount of postage requested, accounting for the postage dispensed from the vendor meter account and accounting for the dispensed postage by origin zip code. At step 120, the requested online postage is sent to the customer in the same manner as known virtual postage metering transactions.

Figure 4:
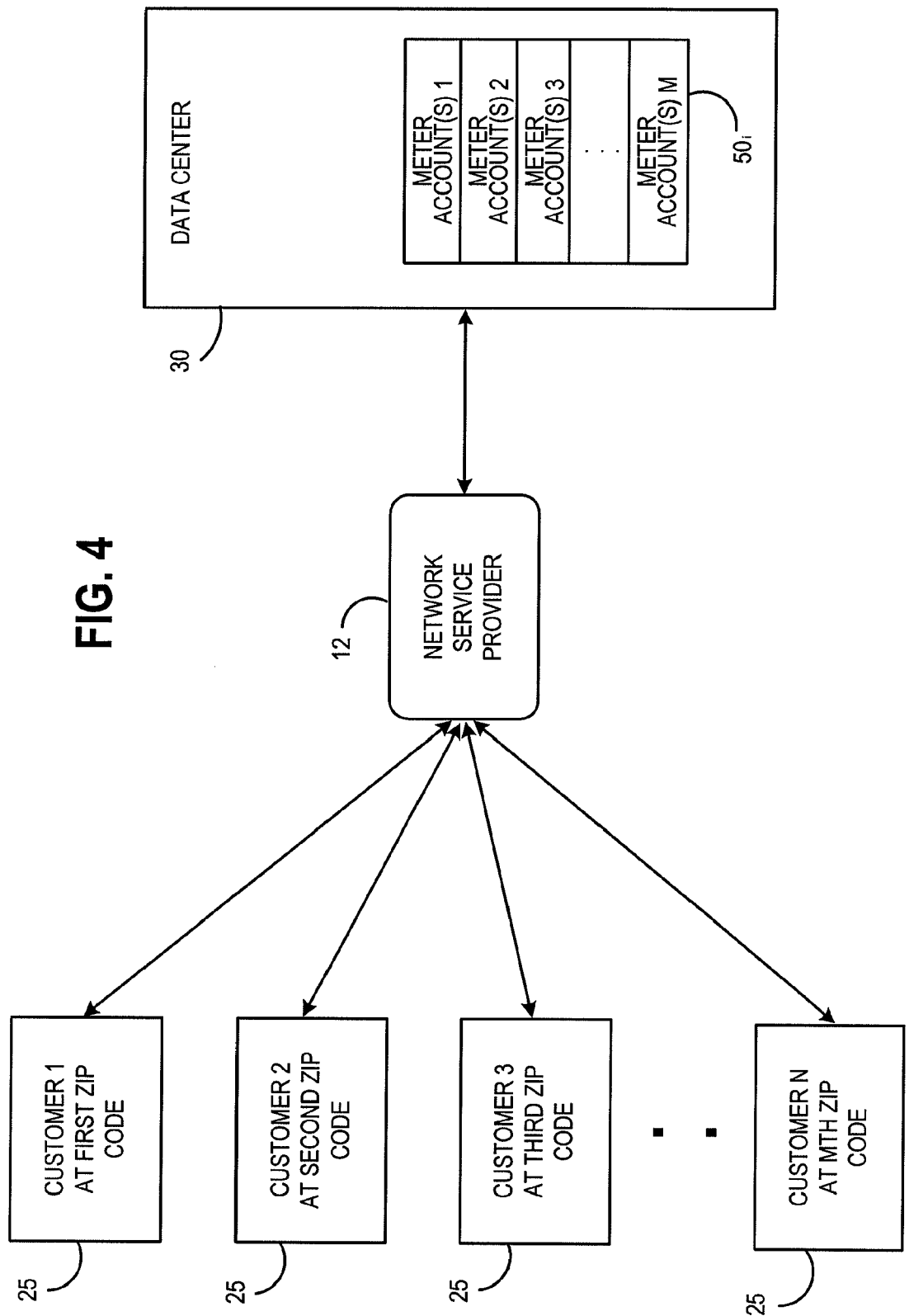
FIG. 4 is a block diagram of a second embodiment of an instant virtual metering system with at least one vendor meter account for each origin zip code.

Referring now to FIG. 4, a second embodiment is described in which, the meter vendor has a plurality of meter accounts (meters) 50 assigned to it at Data Center 30, with at least one meter account $50_i$ (where I is 1 through m, and m is the total number of zip codes in the U.S.) being licensed to vendor for dispensing postage in each zip code in the U.S. In this embodiment, the process is identical to that in FIG. 3 except that postage is brokered off of a meter account that has the same origin zip code as that the origin zip of the customer's request. In this manner, the proper post offices get credit for their inbound mail. A meter $50_i$ is "loaned" to a customer for immediate use without the need for postage meter license to the customer. Customers download postage payment evidencing from meter $50_i$, preferably through the Internet. The number of meter accounts per zip code will be determined by the vendor to adequately support the customers requesting postage.

The present invention is suitable for use on a permanent arrangement, i.e., where low use customers never need to obtain a meter license to take advantage of PC postage over the internet. Thus, the present invention is not limited to requiring the customer to request a meter license, but can be used for the vendor dispensing postage from its online meter account to casual customers, i.e., customers who do not intend to register for a personal meter license but are content to use online PC postage. The above descriptions provide an instantaneous "loan" of the meter for the instant transaction. Once a user establishes a personal identity registration, for example, one that include a username and password subsequent requests can be concluded using the previously provided customer information. It is further noted that the vendor can "loan" its vendor online meter account for a period of time, such as a day or until the customer meter license is approved, provided the vendor has a plurality of such accounts to handle a plurality of such requests. Such a loan arrangement is described in more detail below.

To prevent misuse of a meter account not assigned to a customer, the system preferably identifies the customer, for example by username and password, who requested and printed the indicium (non-repudiation). Anonymous customers will not be permitted. Strong authentication between a customer and the indicium is desired. For example a transaction number, such as an incremental transaction count, will be included in the indicium.

In a third embodiment of the present invention, a collection of meters, either all at one zip code or a plurality per zip code, are loaned temporarily out until the customer's license is provided by the Post. In this embodiment, again a plurality of meters are licensed to the meter vendor (by zip code or all at one zip code) and a meter is loaned to a customer. The customer uses this meter until receiving a license from the Post that assigns a new meter to the customer, at which time the loan of the temporarily assigned meter ends, which return the meter to a pool of available meters, and the customer begins using the assigned/licensed meter.

Figure 5:
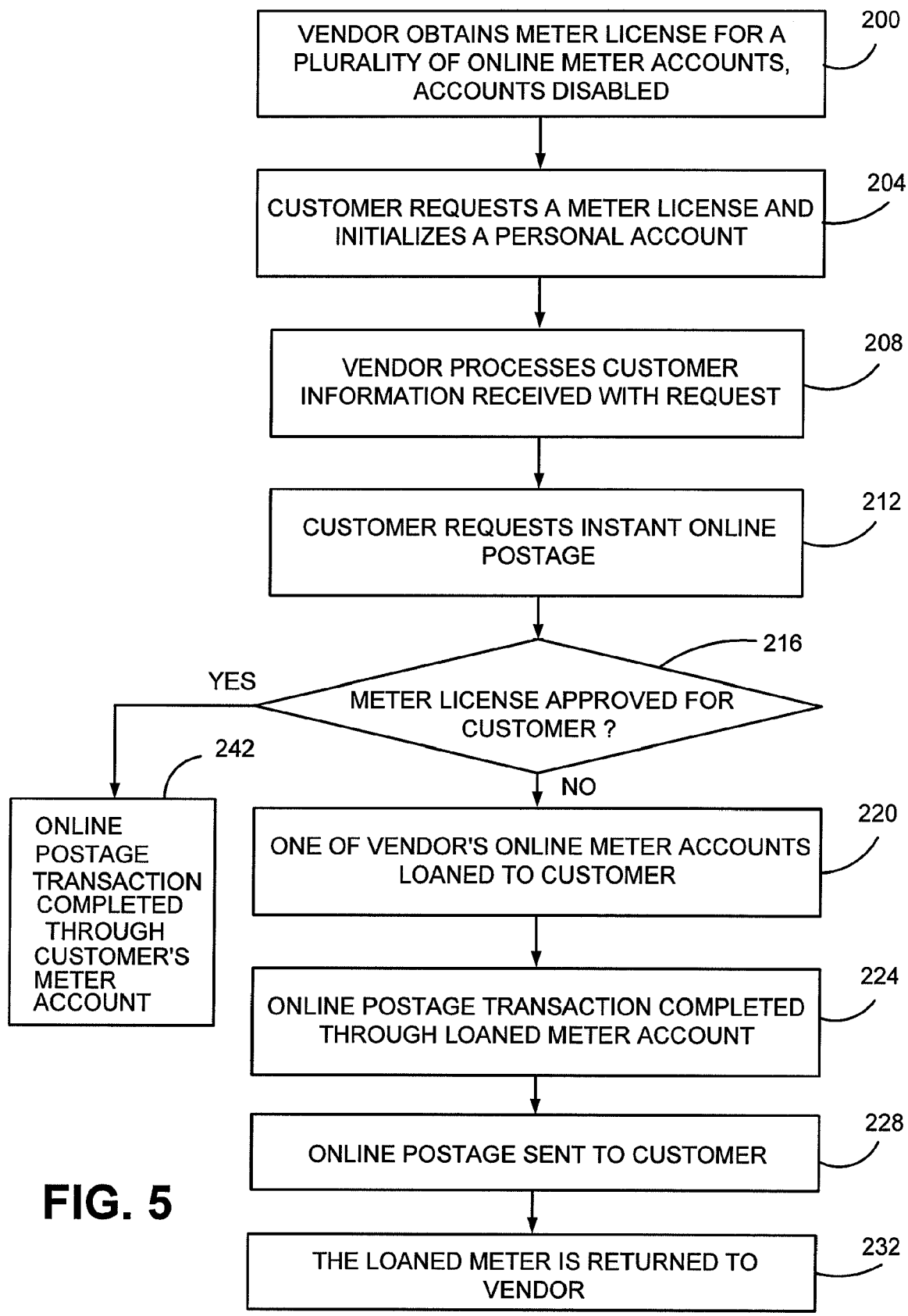
FIG. 5 is a flow chart of an alternate embodiment wherein a vendor meter account is loaned to a mailer while the mailer's meter license approval is in process.

Referring now to FIG. 5, the third embodiment is described as an alternative process of instant postage metering in which a meter account is loaned to a customer who has just registered for a meter license so that the customer can immediately print postage while approval of the meter license is being processed. At step 200, vendor obtains a plurality of meter licenses corresponding to a plurality of online meter accounts (meters). The meters are disabled and without postal value. The meter accounts are licensed to process transactions for a plurality of origin zip codes. At step 204, a customer registers to obtain a meter license by completing a request for a meter license that heretofore must be approved before customer could download postage. At step 208, the vendor processes customer information, such as name, address and method of payment (such as a credit card), that is provided with the request form the meter license. At step 212, the customer communicates with Data Center 30, to dispense postage. The customer requests online postage by entering or confirming postal information, including recipient address and postage amount and origin zip code. At step 216, if a meter has not been assigned and licensed to that customer, then at step 220, the meter vendor immediately temporarily assigns a meter from the plurality of meters that are licensed to the postage meter vendor to the customer. The postage meter vendor passes to the USPS a "meter move" notice, which is known procedure when a meter is moved from one customer to another. At step 224, the customer's requested transaction is instantly processed through the temporarily loaned meter. Such processing includes charging the customers credit card account for the amount of postage requested, accounting for the postage dispensed from the vendor meter account and accounting for the dispensed postage by origin zip code. At step 228, the requested online postage is sent to the customer in the same manner as with known virtual postage metering transactions. At step 232, if the system recognizes that a loaned meter account has gone idle for some period of time, the system reclaims the meter (again with a "meter move" notice to the USPS) and makes it available for reassignment. If the customer comes back that had their meter reclaimed, a different meter is picked from the pool and assigned to them. If at step 216, a meter has been assigned and licensed to the customer, then at step 242 the online postage transaction is completed using the customer's new meter.

It will be understood that, for this embodiment, the postage meter vendor could have a plurality of meters that are registered at a single zip code, for example the postage meter vendor's origin zip code. The postage meter vendor then loans such meters to customers with the "meter move" specifying the customers intended drop point. As previously described, the duration of the loan can be for any length of time from a single transaction with the meter to a predetermined period, such as the time it takes the customer to obtain a meter license. However, that the duration of the loan can be for a more substantial period, for example a month or a year. It will be understood that the shorter loan periods simply drive up the number of "meter move" notices sent to the USPS.

In accordance with the present invention, customers desiring to print online postage can print postage immediately before a meter license is approved for the customer. The third embodiment is now described below with reference to Pitney Bowes Clickstamp® Online Internet Postage the process of loaning a meter account to a customer is part of a marketing strategy to encourage use of the system by providing the instant printing of PC postage evidencing.

The present invention provides Clickstamp® Online Postage customers with the ability to print postage immediately after online registration is completed and the client software for customer's PC has been loaded into the PC.

There are two ways that Pitney Bowes can loan a meter account to a customer. In one way, Pitney Bowes moves a loaner meter account for use by the customer and later transfers the loaner meter account to the customer's meter account when the customer's meter license is approved. In a second way, the loaner meter is returned to Pitney Bowes control and a new meter account is initialized to the customer's meter account when the customer's meter license is approved.

Figure 6:
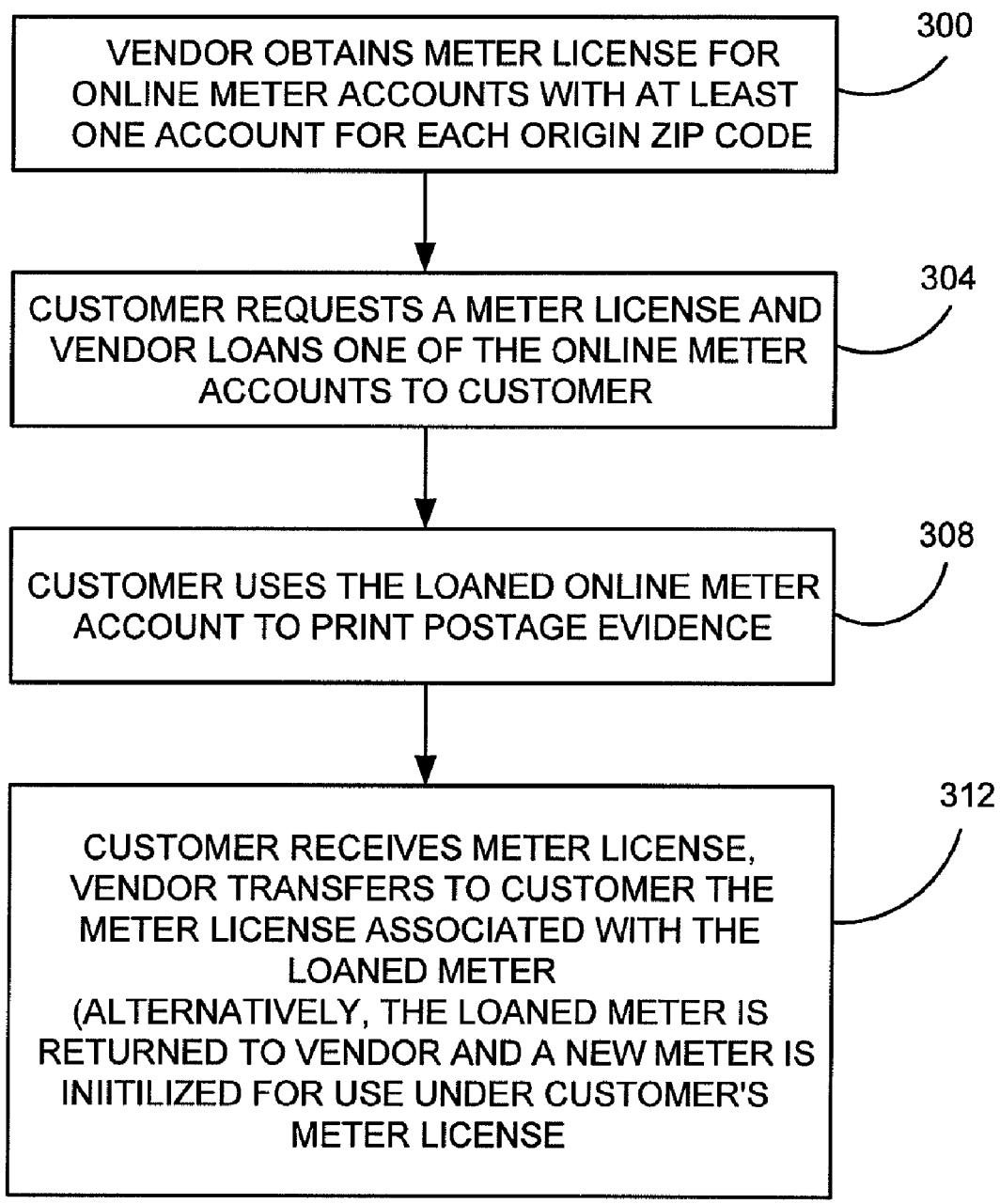
FIG. 6 is another flow chart of a vendor meter account being loaned to a customer.

Referring now to FIG. 6, at step 300, the system is initialized when Pitney Bowes obtains a license from the USPS for at least one Clickstamp® Online meter (meter account) with an origin zip code associated with every postal finance district. Each meter is authorized in accordance with the IBIP Centralized Specifications and is ready for use except that the meter state is set to a disabled mode to prevent unauthorized use.

At step 304, customer registration occurs. When a customer registers for a meter license for the Clickstamp® Online Product, Pitney Bowes loans to the customer the use of a meter licensed in the customer's zip code (loaner meter). The meter state for the loaner meter is changed to an enabled mode to allow authorized use. The loaner meter is provided to the customer for use pursuant to a short-term, for example 5 days maximum, agreement which expires at the end of the term or when a meter license is obtained for the customer, whichever occurs first. Following a registration process, Pitney Bowes applies for a postage meter license on behalf of the customer. Pitney Bowes charges the loaner meter with an initial postage amount, for example $25 pursuant to a marketing program. In the event that the loaner meter has funds remaining from a previous loan attempt, the initial refill is added to the remaining funds. A Virtual PSD record and Clickstamp® Online account corresponding to the loaner meter is modified to accept the customer's user ID, Password, and use the customer's e-mail address for all outgoing communications. However, the license and corresponding Virtual PSD record and Clickstamp® Online remain in Pitney Bowes name. In effect, Pitney Bowes is brokering postage to the customer. A new user secret key is generated for the meter via a re-keying process. A new user access key is e-mailed to the customer.

At step 308, the customer uses the loaner meter. The customer is instructed to download the client software from a Pitney Bowes the Clickstamp® Online web site. Upon first use of the Clickstamp® Online product, the customer is prompted to enter his access key. Once the key is entered, the customer may begin dispensing postage.

Certain restrictions are associated with the use of the loaner meter. The customer cannot perform a meter refill operation until the meter is licensed in the customer's name. The customer is allowed to dispense only up the amount of the initial postage amount. In the event that the USPS rejects the customer's license application, the meter will immediately be disabled and the customer notified. Any indicium dispensed is charged to the customer's selected method of payment, such as a credit card. The meter license remains in Pitney Bowes' name, and will return to a disabled state until it is loaned to another customer.

At step 312, when the customer's license is received, Pitney Bowes transfers the meter to the Customer's meter license. Pitney Bowes uninstalls the meter serial number under Pitney Bowes' license, and installs the meter serial number under the customer's license. Pitney Bowes updates all Clickstamp® Online accounting and Virtual PSD database records to complete the license transition. Pitney Bowes applies for a new "loaner" license in the zip code of the transitioned meter in preparation for the next customer registration.

An alternative to step 312, when the customer's license is received, Pitney Bowes authorizes a new meter for the customer and requires the customer to delete and re-install the client application corresponding to the new meter. A new access key is e-mailed to the customer. Upon the next access to the Clickstamp® Online server, the new access key is entered and the customer begins using the new meter. Pitney Bowes processes the loaner meter transaction logs to transfer any customer funds remaining to the customer's new meter account and bills the customer's credit card for any postage used. Pitney Bowes disables the loaner meter until required for another customer.

It will be understood that, although the embodiments of the present invention are described as postage metering systems, the present invention is applicable to any value metering system that includes transaction evidencing, such as monetary transactions, item transactions and information transactions.

In accordance with the present invention, payment for postage can occur through various methods. One method comprises a charge to the customer's micropayment account. See, for example, U.S. patent application Ser. No. 09/474,327 filed Dec. 29, 1999 and entitled METHOD AND SYSTEM FOR SELLING DIGITAL CONTENT PRODUCED IN AN ONLINE COMMERCIAL TRANSACTION. Provided a relationship exists between a provider of micropayment services on the Internet and the postage meter vendor, the postage meter vendor may collect funds for each instant metering transaction from the customer's account on the micropayment system.

Another method related to postage payment is referred to as indicia dispensing. A customer may request an indicium from the postage meter vendor. The vendor can dispense the rights to dispense the indicium by way of a secure file. Upon opening the secure file, the customer is asked if a purchase is desired, and if so indicated, software on the customer's desktop requests the key to decrypt the file (containing the rights to print the indicium, and perhaps information about the indicium (or the indicium itself) at the cost of payment being made from the customer's micropayment account to the postage meter vendor (who makes payment to the Post).

Yet another method related to postage payment is referred to as target advertising printed on a mailpiece. See U.S. Pat. No. 6,141,654, filed Dec. 30, 1998, which describes a system and method for placing advertising information on a mailpiece to subsidize postage payment for the mailpiece. This includes placing a coupon on the mailpiece to give the mailpiece more value. This concept may be extended to include placing on the coupon a barcode that contains information concerning the sender of the mailpiece as well as the recipient. Such information may be in the open so any redeemer of the coupon has access to the information (provided they have the appropriate bar code scanner). Alternatively, the information may be encrypted such that the redeemer would pay for one or more keys, for example the sender's key or the recipient key, to decrypt the information. The information may be an identifier that can be collected and sent by the redeemer to the indicia provider and returned information about the mail piece. In this way only the information the redeemer pays for is made available to the redeemer.

Another method related to postage payment is referred to herein as "e-Book" of stamps. One of the problems in selling postage over the Internet is aggregating the service charges an indicia provider, i.e. postage meter vendor, must collect to make such a service financially viable. The current method is to extract a service subscription charge from users. This is not consistent with how customers view stamps. The final alternative for payment suggested is an online e-book of stamps. This breaks down to two possible deployments. In one deployment, the indicia provider charges a surcharge on a book of stamps. In the current economy of stamps, an example might be to charge $4.00 for a book of eleven 34-cent stamps (face value: $3.74). The indicia provider collects the difference ($0.26) as a service fee. Alternatively, the indicia provider charges the face value of the stamps at some minimal amount that makes sense to aggregate on a credit card. The indicia makes revenue based on the ad sales from ads displayed to customers as they come to dispense indicia. These ads are of high value inasmuch as they can be highly targeted (again, based on previous disclosures) and that you have a high assurance that customers will be attracted to the site inasmuch as they have a commitment to the site based on the stored value they have put on the site in the pre-purchasing of the stamps.

Another method related to postage payment is interfacing with an online rewards program (See for example U.S. Pat. No. 5,794,210). Online rewards programs exist today where Internet users are "rewarded" for their use of the web and "forced" viewing of advertising during their use. Through a relationship with an indicia provider, such online rewards programs could be used to transfer funds from the program to the indicia provider in exchange for indicia for the program's users.

While the present invention has been disclosed and described with reference to a specific embodiments thereof, it will be apparent, as noted above that variations and modifications may be made therein. For example, the present invention is suitable for replacing the USPS requirement of having a meter license for each customer and requiring customers to register with a trusted third party, such as a meter vendor and maintain an active account while using a meter licensed to the third party. It is, thus, intended in the following claims to cover each variation and modification that falls within the true spirit and scope of the present invention.

Clickstamp® is a registered trademark of Pitney Bowes Inc.

What is claimed is:

1. A method for a vendor to dispense metered postage over a network to a remote personal computer, the method comprising:

establishing from a postal service a postage meter license that is not allocated to a particular customer of the vendor, the meter license being associated with a meter account maintained at a computerized data center;

receiving, by a processing device at the computerized data center via the network, a transaction request for postage from a customer using the remote personal computer, the customer not previously associated with the meter license, said transaction request including information from the customer corresponding to the transaction requested and payment method;

processing, by the processing device at the computerized data center, the transaction request by creating evidence of postage payment and to account for the created evidence of postage payment in the meter account;

effecting payment for the transaction based on the information received from the customer; and sending, by the processing device, the evidence of postage payment from the computerized data center to the remote personal computer for use by the customer, thereby enabling the customer to obtain metered postage from the vendor without using an individually associated meter license from the postal service.

2. The method of claim 1, further comprising:

determining an origin of deposit postal code for the requested transaction.

3. The method of claim 2, wherein the origin of deposit postal code is included in the information from the customer.

4. The method of claim 1, wherein the information from the customer includes a username, password and credit card information whereby a personal account is established for subsequent transactions.

* * * * *